(12) United States Patent
Blondek et al.

(10) Patent No.: US 8,468,736 B2
(45) Date of Patent: Jun. 25, 2013

(54) TWIST GRIP DRIVE HANDLE OUTRIGGER POSITIONER

(75) Inventors: Peter Blondek, Port Salerno, FL (US); Ronald Karpanty, Port Salerno, FL (US); Scott Rupp, Port Salerno, FL (US)

(73) Assignee: Rupp Marine, Inc., Port Salerno, FL (US)

( * ) Notice: Subject to any disclaimer, the term of this patent is extended or adjusted under 35 U.S.C. 154(b) by 334 days.

(21) Appl. No.: 12/900,903

(22) Filed: Oct. 8, 2010

(65) Prior Publication Data

US 2011/0083357 A1 Apr. 14, 2011

Related U.S. Application Data

(60) Provisional application No. 61/251,009, filed on Oct. 13, 2009.

(51) Int. Cl.
*A01K 97/10* (2006.01)
(52) U.S. Cl.
USPC ............. 43/27.4; 43/21.2; 114/255; 248/515; 248/514
(58) Field of Classification Search
USPC ........... 43/27.4, 21.2; 114/255, 364; 248/514, 248/515
See application file for complete search history.

(56) References Cited

U.S. PATENT DOCUMENTS

| | | | | | |
|---|---|---|---|---|---|
| 952,812 | A | * | 3/1910 | Jorgensen | 43/21.2 |
| 1,877,845 | A | * | 9/1932 | Gerline | 248/514 |
| 2,360,402 | A | * | 10/1944 | Determan | 43/21.2 |
| 2,859,059 | A | * | 11/1958 | De Loach et al. | 248/181.2 |
| 2,884,213 | A | * | 4/1959 | Hiering | 248/515 |
| 2,927,754 | A | * | 3/1960 | Davis | 248/514 |
| 3,008,259 | A | * | 11/1961 | Zornes | 248/515 |
| 3,212,740 | A | * | 10/1965 | Greenberg | 248/514 |
| 3,516,190 | A | * | 6/1970 | Cook | 43/21.2 |
| 3,570,793 | A | * | 3/1971 | Shackel | 43/21.2 |
| 3,708,141 | A | * | 1/1973 | Friedgen et al. | 248/515 |
| 3,724,791 | A | * | 4/1973 | Mason | 248/514 |
| 3,961,437 | A | * | 6/1976 | Lewis | 43/27.4 |
| 4,017,998 | A | * | 4/1977 | Dumler | 43/21.2 |
| 4,044,489 | A | * | 8/1977 | Henze et al. | 43/27.4 |
| 4,063,704 | A | * | 12/1977 | Rother | 248/515 |
| 4,803,938 | A | * | 2/1989 | Sergeant | 114/39.3 |
| 4,813,171 | A | * | 3/1989 | Cooper et al. | 43/27.4 |
| 4,993,346 | A | * | 2/1991 | Rupp | 43/21.2 |
| 5,140,928 | A | * | 8/1992 | Frick | 43/27.4 |
| 5,243,927 | A | * | 9/1993 | Messick | 43/27.4 |
| 5,438,789 | A | * | 8/1995 | Emory | 43/21.2 |
| 5,592,893 | A | * | 1/1997 | Jordan et al. | 114/255 |
| 5,738,035 | A | * | 4/1998 | Rupp, II | 43/21.2 |
| 5,778,817 | A | * | 7/1998 | Rupp | 43/21.2 |
| 5,855,088 | A | * | 1/1999 | Lee | 43/21.2 |
| 6,622,741 | B2 | * | 9/2003 | Lai | 248/514 |
| 6,668,745 | B2 | * | 12/2003 | Slatter | 114/255 |
| 6,766,757 | B1 | * | 7/2004 | Tilley | 43/21.2 |

(Continued)

*Primary Examiner* — Darren W Ark
(74) *Attorney, Agent, or Firm* — McHale & Slavin, P.A.

(57) ABSTRACT

A twist grip drive handle outrigger device for use on a fishing vessel having a first tubular member for holding of an outrigger pole, which is rotatably journaled to a second tubular member that is mounted to a fixed structure. The second tubular member houses a twist grip drive handle assembly that allows manual rotation of the outrigger pole. The driver assembly constructed and arranged to provide an unlocked condition by the twisting of the handle thereby allowing adjustment of the outrigger pole upon rotation of the first tubular member. The rotation of the first tubular member allows for movement of the outrigger pole from a stowage position to a trolling position and vice versa.

15 Claims, 8 Drawing Sheets

U.S. PATENT DOCUMENTS

| | | | |
|---|---|---|---|
| 6,769,377 B2 * | 8/2004 | Rupp, II | 43/21.2 |
| 7,114,283 B2 * | 10/2006 | Slatter et al. | 43/27.4 |
| 7,197,845 B2 * | 4/2007 | Wilcox et al. | 43/21.2 |
| 7,296,377 B2 * | 11/2007 | Wilcox et al. | 43/27.4 |
| 7,509,769 B2 * | 3/2009 | Wilcox et al. | 43/21.2 |
| 7,669,361 B2 * | 3/2010 | Baez | 43/27.4 |
| 8,186,095 B2 * | 5/2012 | Wilcox et al. | 43/27.4 |
| 2008/0053361 A1 * | 3/2008 | Nicholson | 248/514 |

* cited by examiner

TWIST GRIP DRIVE HANDLE OUTRIGGER POSITIONER

CROSS-REFERENCE TO RELATED APPLICATIONS

This application claims the benefit of U.S. Provisional Patent Application No. 61/251,009, entitled "Twist Grip Drive Handle Outrigger Positioner", filed on Oct. 13, 2009, the entire contents of which is hereby expressly incorporated by reference.

FIELD OF THE INVENTION

This invention relates to the field of fishing and more particularly to an improved outrigger positioner for use on fishing boats.

BACKGROUND OF THE INVENTION

While numerous methods of saltwater fishing exist, the use of a boat has many advantages for both the professional and recreational fisherman. For this reason, many boat manufacturers have built vessels directed solely to the art of fishing. Open fishing boats, so defined due to the open area around a center console, are of particular interest since they are capable of high speeds, are economical to operate, and provide a very safe platform from which to fish from.

The use of outriggers are a common fixture on fishing vessels. The open fishing vessel can be made to run extremely fast and are highly maneuverable making them the preferred vessel for most fishing events. Mounting of an outrigger system on a small open fishing vessel is typically performed from the T-top. Most open fishing vessels include the use of the T-top that, as the name implies, is formed from a "T" like structure to provide shade and rain protection for those standing around the console. The T-top does not inhibit operation of the vessel and allows an occupant to walk around the vessel uninhibited in a semi-protected position.

The Assignee of this present invention is the owner of U.S. Pat. Nos. 5,738,035; 4,993,346; and 6,769,377 incorporated herein by reference, which teach the use of outriggers for use on fishing vessels having a T-top, half tower, or the like. Current boating designs for high speed fishing vessels ideally allow the placement of outriggers in a stowage position, movable to a trolling position, without interfering with the occupant area. The use of a combination control lever and locking mechanism permits placement of the outrigger by manipulation of the control lever safely within the confines of the vessel.

Fishing with outriggers is performed when a fishing vessel is driven slowly, commonly referred to as trolling, which permits the strategic placement of bait behind the vessel. Trolling allows the fishing vessel to cover large areas of water so as to increase the chance of catching fish. The quantity and spacing of the bait placed behind the vessel is generally proportional to the size of the vessel, as well as the success of the fishing expedition. If the bait is properly placed, the wake generated by the vessel can be made to appear like a school of fish. Bait that appears to be struggling or separated are most attractive to predator fish.

The positioning of bait behind a vessel would be limited to the width of the vessel but for the use of the outriggers. Most open fishing vessels have a beam less than ten feet and trolling with more than two fishing lines behind such as vessel provides very little distance between the baits and limits the ability to place bait outside of the boat wake. Further, more than two lines behind a narrow beam vessel severely limits vessel maneuvering. Even a gradual turn may cause bait lines to cross and become entangled. In addition, closely positioned baits can become entangled during a fish strike.

The use of outriggers provides a means for effectively widening the spacing of the bait, as well as adding additional bait/lines without fear of tangling of the lines. An outrigger is basically a long pole having a proximal end coupled to the vessel and a distal end that can be rotated from a stowage position outboard to a trolling position. A positioning line is drawn along the length of the outrigger pole wherein release clips secured to the positioning line are used to secure the fishing pole line at a desired location. When a fish strikes the bait, the release clip disengages the fishing line from the positioning line, and the fisherman is free to reel in the fish without interference. Proper placement of the outrigger pole and fishing line increases the chances of fish being drawn to the bait.

For example, by use of two fifteen foot outriggers, a vessel with a ten foot beam may extend the distances between bait, effectively covering a thirty foot spread behind the vessel. However, having outrigger poles extend from each side of a vessel during non-fishing times has obvious drawbacks. For this reason, outriggers must be stowable to allow for normal traveling and docking. The outriggers are typically stored within the vertical plane of the vessel, the vertical plane defined by the side walls of the vessel. In operation, the outrigger is swung laterally outward to a deployed position for fishing purposes. Typically, each outrigger pole may be ten to thirty feet long, longer poles are cable trussed to prevent excessive flexing.

Mounting outriggers to open fishing vessels presents numerous problems, mainly due to the stability of a narrow beam boat in open water, as well as the operational speeds that the open fishing vessels are capable of. A basic requirement is the safety of the vessel occupants, wherein an operator of the outrigger can be rotated while the occupant remains in the safety of the vessel, preferably while standing next to the console, beneath the T-top. Associated with this safety aspect is the need for a locking mechanism capable of withstanding the large cantilever forces presented by the outrigger arrangement. For instance, a fifteen foot outrigger secured to a T-top has a distal end cantilevered from the base. When the vessel is placed in an ocean environment, it is not uncommon for the vessel to be subjected to large sea swells wherein the twisting force of the outrigger pole places an enormous strain on the base of the outrigger. If the outrigger's sole source of outrigger pole positioning is the locking mechanism, the locking mechanism must be able to withstand the entire force presented by the cantilevered configuration.

Accordingly, what is lacking in the art is an outrigger positioner that allows for rotational movement of an outrigger pole by use of a drive handle assembly that is in a normally locked position and must be twisted to an un-locked position to all movement of the outrigger pole.

SUMMARY OF THE INVENTION

The instant invention allows for movement of an outrigger pole that is supported by its bottom end portion above a T-top and permits rotational movement of the outrigger pole between the stowage position and the trolling position and vis versa. A drive handle is used for both unlocking of the outrigger and control of the outrigger during rotation. Rotation can be performed by a person standing in the fishing vessel in the shelter of the T-top by manipulation of the drive handle.

In general, a first tubular member is rotatably journaled to a second tubular member which together forms a base member. The second tubular member has a top end and a bottom end forming a longitudinal axis there between. The first tubular member includes a spring loaded drive handle that maintains the handle in a fixed locked position. Upon the twisting of the drive handle, in a similar manner as a motorcycle throttle, the drive handle compresses a spring and causes the locking portion of the handle to disengage from a rod base allowing movement of the rotation tube used for rotation of the outrigger from a stowage position to an operating position, or visa versa.

An objective of the instant invention is to teach the use of a positive control outrigger pole utilizing a twist grip locking system.

Another objective of the instant invention is to teach the use of a spring loaded engagement mechanism that prevents the handle from disengaging while in a stowage or trolling position.

Another objection of the instant invention is to allow for commonality of parts, and in particular, the use of a common handle assembly that can set up to twist in a clockwise or counter-clockwise rotation allowing the use of the same grip on either the port or starboard mounting position.

Still another objective of the instant invention is the provision of further improvements in the type of outrigger systems provided by the inventions disclosed in U.S. Pat. Nos. 4,993,346; 5,738,035 and 6,769,377.

Other objectives and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objectives and features thereof.

DETAILED DESCRIPTION OF THE PREFERRED EMBODIMENT

Figure 1:
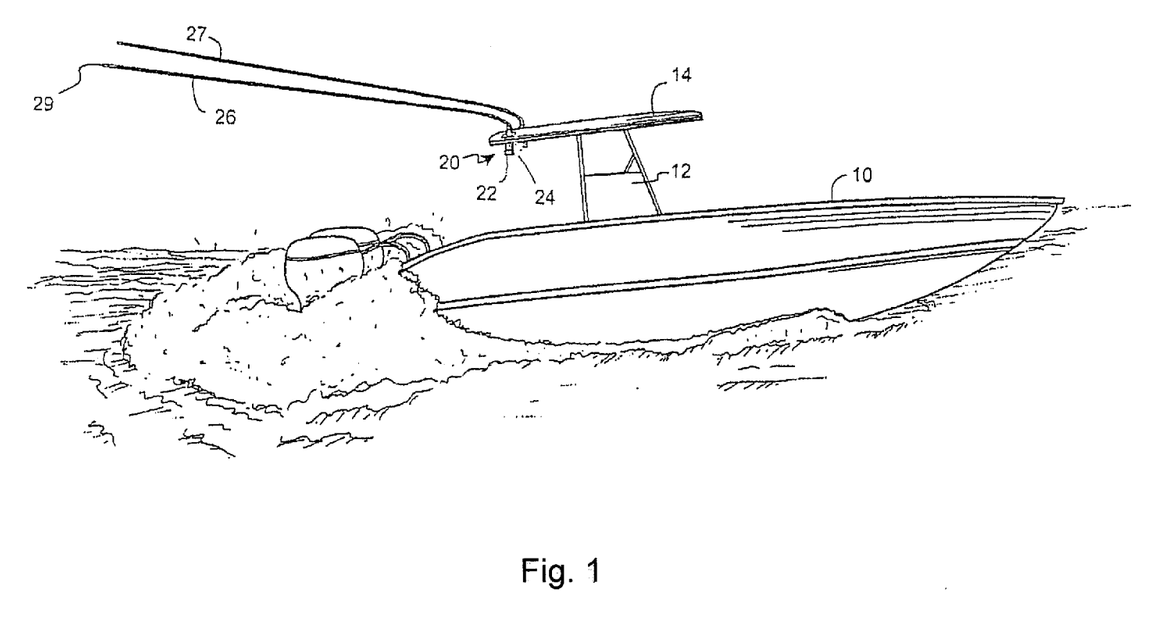
FIG. 1 is a pictorial illustrating the outrigger positioner of the instant invention.
Figure 2A:
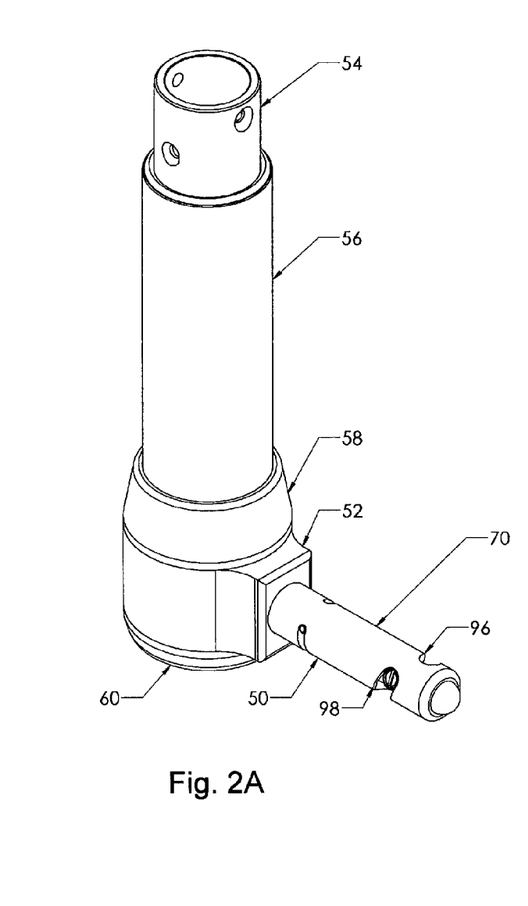
FIG. 2A is a perspective view of the outrigger positioner.
Figure 2B:
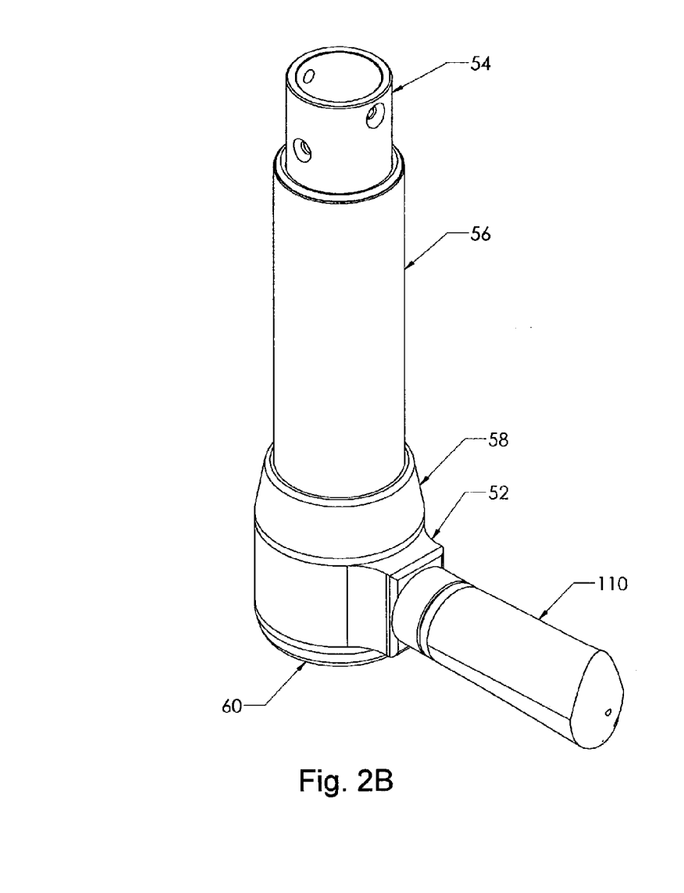
FIG. 2B is a perspective view of the outrigger positioner as shown in FIG. 2A further including a rubber grip positioned over the drive handle assembly.

Referring now to FIG. 1 set forth is a fishing vessel (10) having a centrally located console (12) with a T-top (14) extending over the console (12) providing an area of shade for the those occupants standing around the console. The outrigger assembly (20) of the instant invention includes a base member (22) securable to the T-top (14) having a drive handle positioner (24) mounted beneath the T-top structure (14). The assembly (20) includes a pole (26) on the starboard side of the vessel (10) and a second pole (27) on the port side of the vessel. Operation of the drive handle positioner (24) allows the outrigger (26) to have rotational positioning in a horizontal plane relationship to the base member. In this manner the positioner (24) provides positive movement of the distal end (29) of the outrigger pole (26) between a stowage position and a trolling position. For ease of illustration, this specification will be directed to the use of a manual rotatable handle which is not limiting but rather for purposes of illustration.

Referring to Figures in general the positioner (24) includes a drive handle assembly (50) which works in conjunction with a rotation shield (52) housing a rotation tube (54) positioned within a fixed threaded tube (56). A threaded cuff (58), having internal threads, is secured to the lower externally threaded portion of fixed threaded tube (56). A base plate (126) having a split collar (127) is used to clamp the fixed threaded tube (56) into position. The split collar (127) includes a pair of fasteners that draw the split collar into engagement with the fixed threaded tube (56). The drive handle (50) is used to engage the rotation tube (54) thru a positioning slot (118) located within the slotted base collar (60). The drive handle (50) has a helical cut (98) to allow twisting of the handle in a single direction, the twisting of the handle will place the handle into an unlocked position as will be described further in this specification.

The drive handle assembly (50) consists of a slide handle (70) having a drive handle base (72) with a collar sleeve (76) which are coupled to the slide handle (70) by pin (78). The drive handle assembly (50) further includes the use of an engagement pin (74) slidably insertable into the collar sleeve (76) and drive handle base (72) which are spring loaded by use of an engagement spring (86) and drive handle spring (84) for use in locking the a rotation tube in either a stowed position or a deployed position. A tapered insert (85) is secured to the drive handle (72) for use in conjunction with positioning slot (118) located within the slotted base collar (60). The tapered insert (85) includes a bushing (185) sleeved within tapered insert (85) to prevent galling when tapered insert (85) interfaces with positioning slot (118) formed within slotted base collar (60). The rotation shield (52) has an aperture to allow the tapered insert (85) to pass through the rotation shield (52). Upon rotation of the slide handle (70), the tapered insert (85) is lifted from one of the two apertures within positioning slot (118) thereby allowing the drive handle assembly (50) to move allowing rotation of the outrigger (26,27) coupled to the rotation tube (54).

The drive handle (72) is biased into a loaded position by spring (84) that is positioned between an annular land (88) on the drive handle base (72) and an opposing annular land (89) located within the cylindrical bore of slide handle (70). The engagement pin (74) is attached to the drive handle (72) by a locking pin (78). The locking pin (78) limits movement of the engagement pin (74) within the collar sleeve (76) along the length of slot (80). It should be noted that the pin (78) is first placed through slot (82) then through slot (80), then hole (83), then slot (80) on the opposite side and finally through slot (82) on the opposite side which allows the slide handle (70) to twist in relation to the drive handle (72). The first spring (84) is placed between annular land (88) and opposite annular land (89) allowing movement of the drive handle (72) along the length of the slot (80) in relation to pin placement (78).

Similarly, a second spring (86) is placed within a cylindrical bore (87) of drive handle (72) behind the engagement pin (74) allowing the engagement pin (74) to move inward in relation to the end of the collar sleeve (76) and in relation to slot (80). The engagement pin (74) has a conically shaped tip (75) at the end opposite spring (86). The tip (75) is biased, by spring (86), into contact with the inner cylindrical surface of the base collar (60). When the drive assembly (50) is positioned in either of the two apertures located at the extreme ends of positioning slot (118) the tip (75) will engage one of the two complimentary conically shaped recesses (77) formed on the inner cylindrical surface of the slotted base collar (60). Each of the conically shaped (77) recesses is located diametrically opposed opposite one of the apertures formed in the extreme ends of positioning slot (118). The engagement pin (74) together with conical tip (75) will therefore provide an indexing feature by virtue of this detent function when the handle is positioned in either of these two extreme positions.

Figure 3:
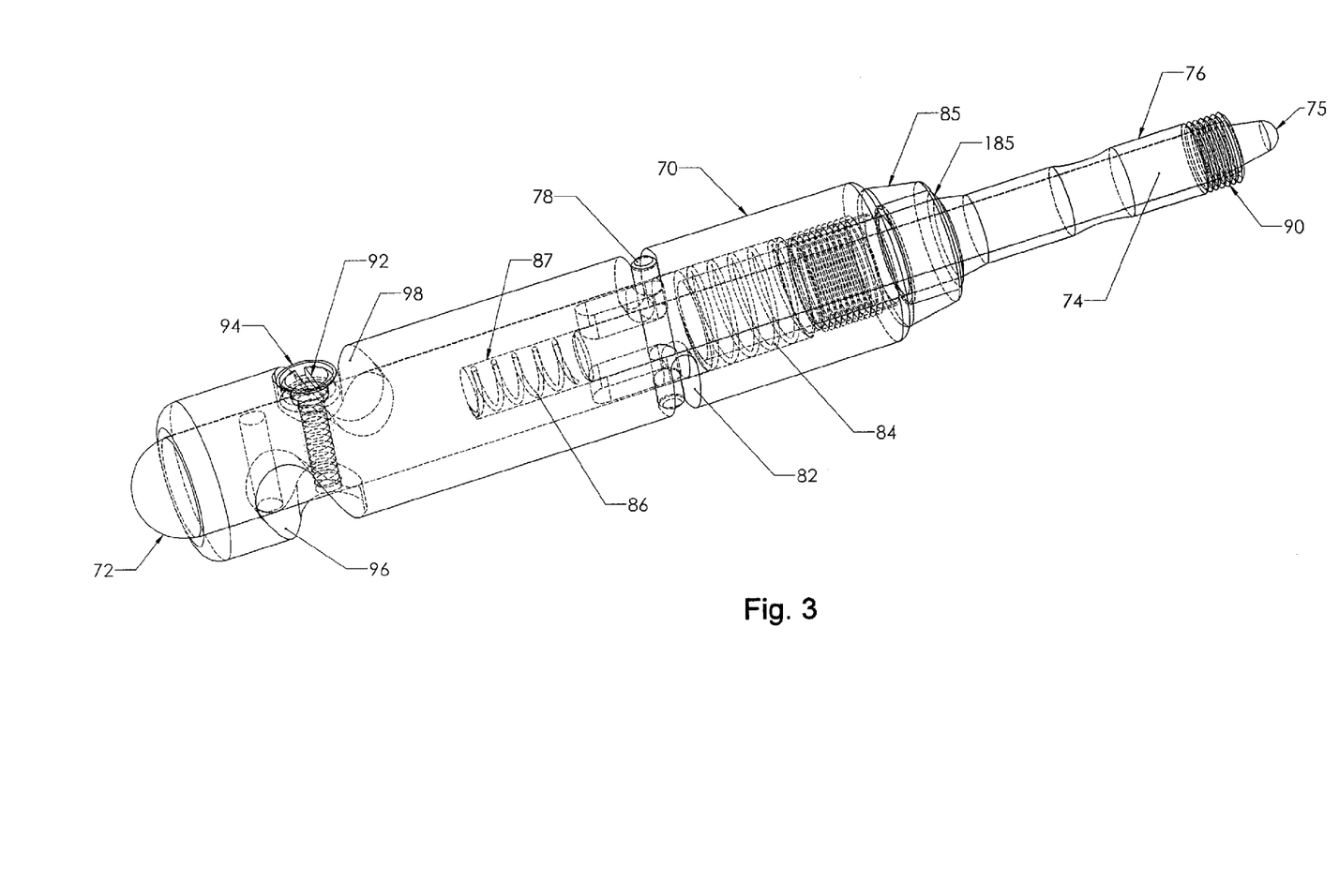
FIG. 3 is a phantom illustration of the drive handle of the outrigger assembly.
Figure 4:
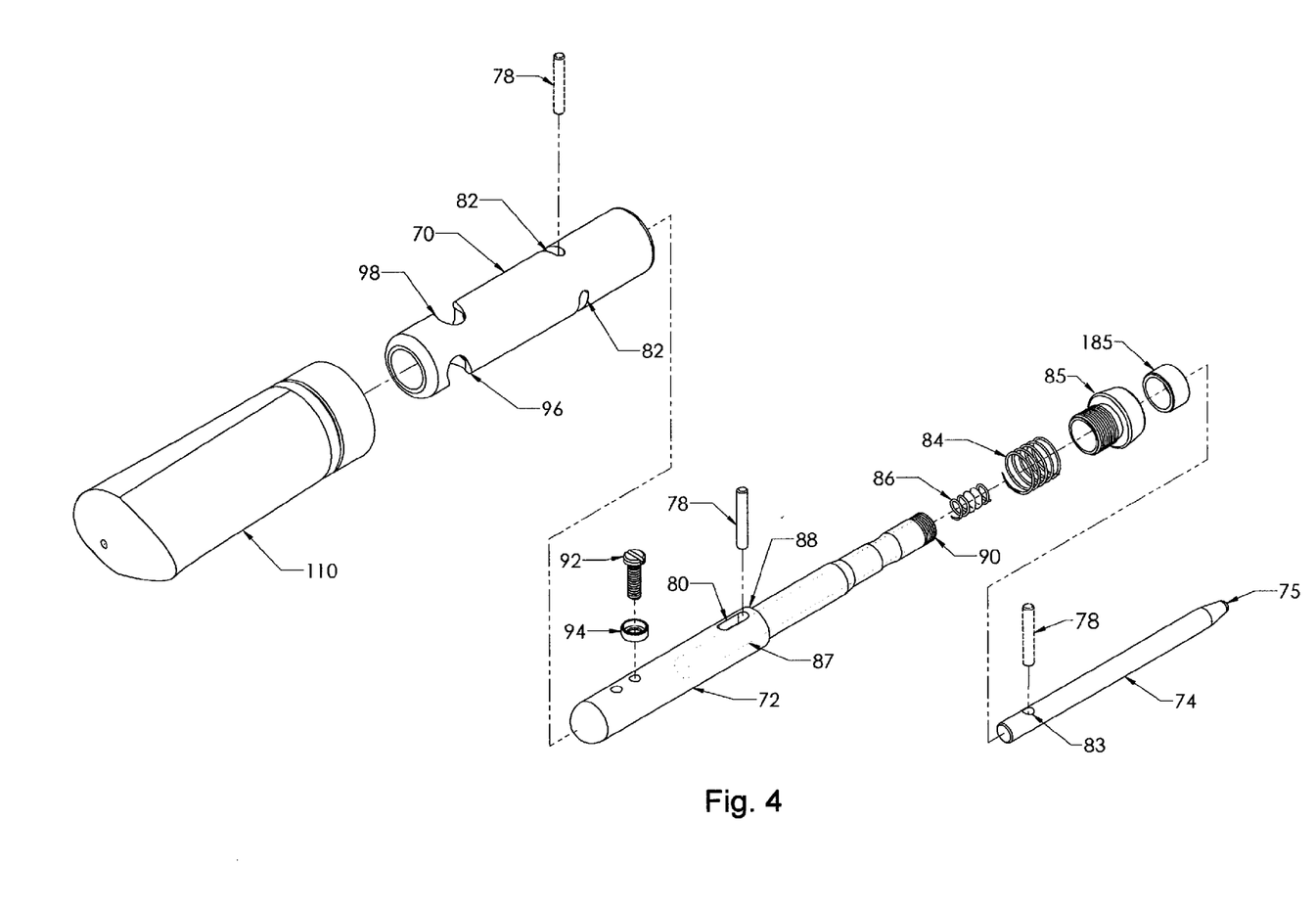
FIG. 4 is an exploded view of the drive handle.

The drive handle (72) incorporates a shoulder bolt (92) and roller bearing (94) in conjunction with a left handed helical cut (96) for a starboard side twist and a right handed helical cut (98) for a port side twist. In operation, the slide handle (70) is twisted causing movement of the drive handle (72) along the path of the helical cut by following the path of the shoulder bolt (92) so as to cause the slide handle (70) to move along the helical cut (96,98) with ease of movement assisted by the roller bearing (94). Upon rotation of the slide handle the helical cut causes the tapered insert (85) that is secured to the slide handle (70) to retract allowing an unlocking of the handle in relation to the slotted base collar (60) that is located within the rotation shield (52). FIG. 4 illustrates an exploded view of FIG. 3 and includes a rubber grip (110) which is placed over the slide handle (70) so as to conceal the slot (82) and helical cuts (96 and 98) yet allow sufficient friction between the inner portion of the rubber grip (110) and the outer portion of the slide handle (70) so as to facilitate slide handle rotation.

Figure 5A:
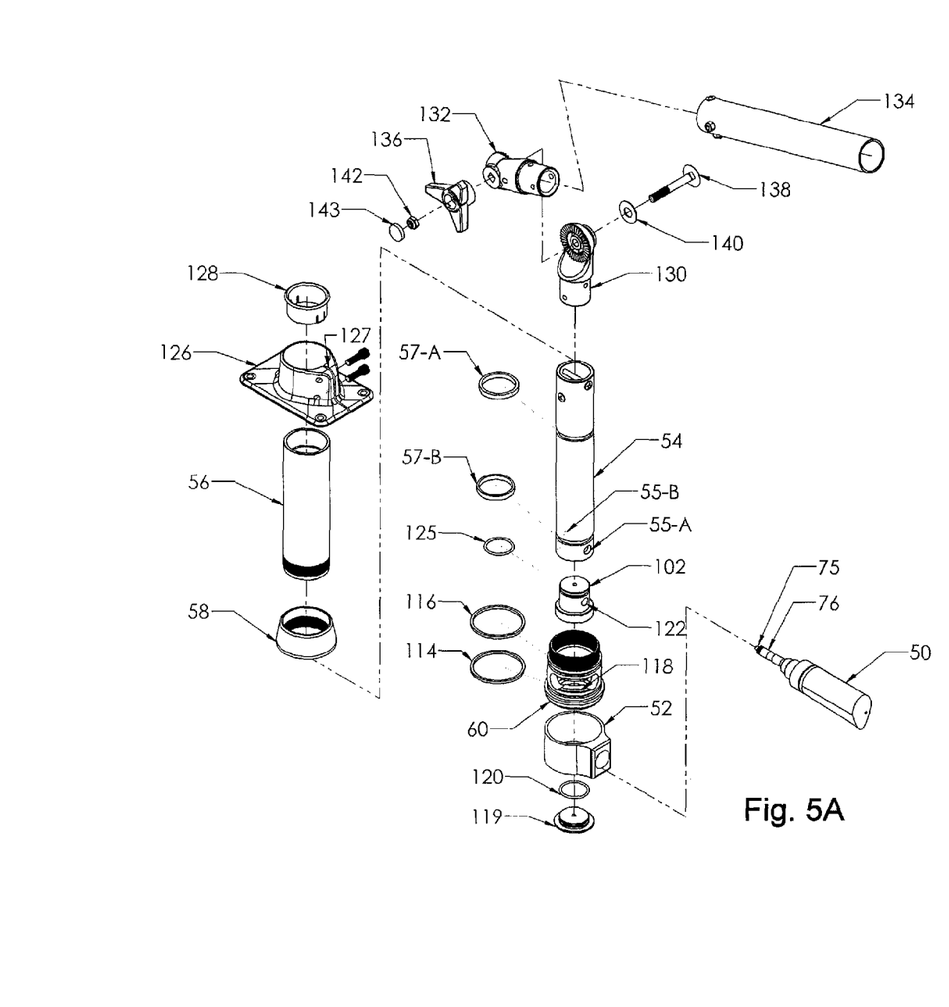
FIG. 5A is an exploded view of the outrigger assembly base and twist grip outrigger handle positioner assembly.
Figure 5B:
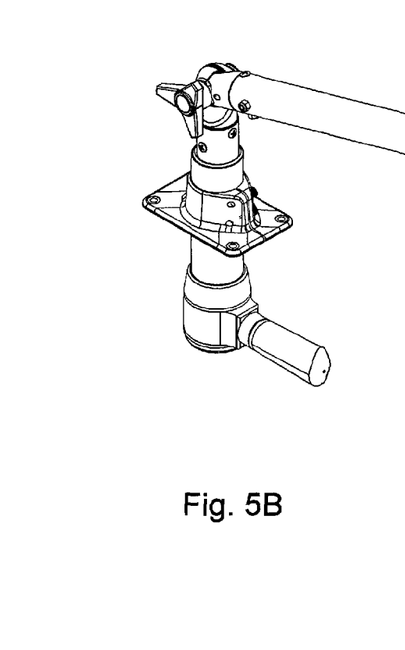
FIG. 5B is a perspective view of the outrigger assembly and twist grip outrigger handle positioner assembly.

Referring now to FIG. 5A, shown is an exploded view of the assembly with the drive handle (50) with collar sleeve (76) that is insertable through a rotation shield (52); slotted base collar (60) and engagement plug (102). An 0-ring 125 is placed at the upper end of engagement plug (102). It is noted that the slotted base collar includes a positioning slot (118) with an enlarged locking aperture located on each end of the slot. The apertures are each sized to receive the collar sleeve (76) and engagement pin (74) carried there within. The diameter of the collar sleeve (76) is less than the distance between the top and bottom of the positioning slot (118) thereby enabling the collar sleeve (76) to pass there through. The diameter of the collar sleeve (76) is also less than aperture (55A) located at one end of rotation tube (54). The diameter of the collar sleeve is also less than the diameter of hole (122) on engagement plug (102). The engagement plug (102) has a second hole diametrically opposed to hole (122) that is sized and configured to allow the collar sleeve (76) to pass there through. During assembly the collar sleeve (76) first passes through the aperture on rotation shield (52), then through positioning slot (118) on slotted base collar (60), then through one of the apertures (55) on rotation tube (54), then through diametrically apertures (122) within engagement plug (102) and it is then finally threaded into opposing aperture (55B) using external threads (90) carried by the collar sleeve (76) and internal threads located within aperture (55B). The slide handle (70) and attached tapered insert (85) is moveable so as to allow the handle assembly (50) to be moved outward in accordance with the helical cut (96, 98); the movement placing the slide handle (70) and tapered insert (85) in a position so that manual rotation of the handle will move the tapered insert (85) from one position of the slot (118) to another, depicting the stowage and deployment position. O-rings (114 and 116) are placed on each side of the slotted base collar (60) so as to prevent excess entrance of dirt and water. A rotation disk (119) having O-ring (120) is positioned beneath engagement plug (102). The slotted base (60) is in receipt of the rotation tube (54) insertable through threaded cuff (58) and threaded tube (56) into the base plate (126). Clamp-on insert (128) will support rotation tube (54). Pair of split bearing rings (57a and 57B) is positioned within grooves formed on rotation tube (54) and support rotation tube (54) within threaded tube (56). Rotation tube (54) extends through the base plate for use in attaching to an outrigger assembly (26, 27) by use of two component radial joint (130 & 132) having engagement threads that allow rotation in relation to the horizontal plane of a radial base tube (134) by tightening of locking knob (136) which is fastened to the radial joint (130 and 132) by carriage bolt (138), nylon washer (140) and locknut (142). Locknut (142) is concealed from view in the assembled condition by a covering cap (143). From the base plate (126) a single outrigger as shown in FIG. 1, or a telescoping outrigger, not shown, can be employed. FIG. 5B is a perspective view of the outrigger assembly, mounting bracket, and twist grip drive handle outrigger positioner.

Figure 6:
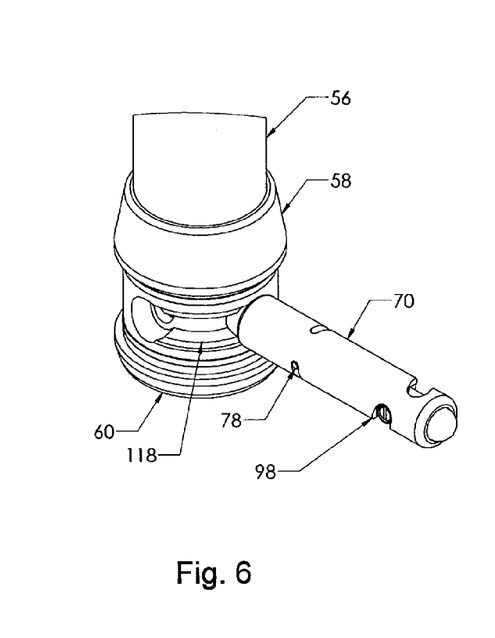
FIG. 6 shows a perspective view of the slide handle locked in one of two positions.
Figure 7:
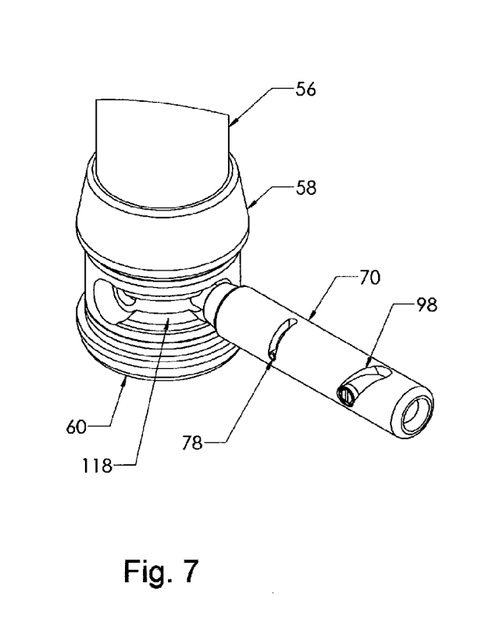
FIG. 7 shows a perspective view of the slide handle unlocked in the position shown in FIG. 6.
Figure 8:
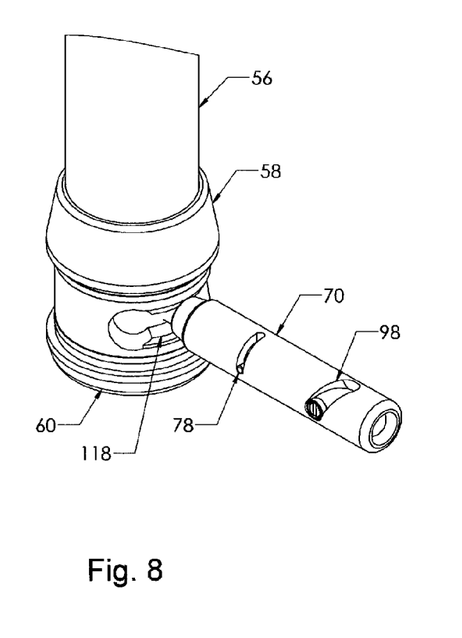
FIG. 8 is a perspective view of the slide handle in an intermediate unlocked condition positioned between the two extreme end positions of the slot.

FIG. 6 shows a perspective view of the slide handle locked in one of two positions. In this position the slide handle (70) is biased into a position wherein it is engaged with one of the two apertures at the extreme ends of positioning slot (118). FIG. 7 shows a perspective view of the slide handle (70) wherein the slide handle is disengaged from the positioning slot (118) located in slotted base collar (60). In FIG. 7 the slide handle (70) has been rotated about its longitudinal axis thereby imparting a linear motion to slide handle (70) causing it to moved radially outward from engagement with slotted base collar (60). FIG. 8 shows a view similar to that shown in FIG. 7 however in this view the slide handle is located in a transition position between the apertures in positioning slot (118). In this position the handle positioning assembly is in an unlocked condition.

Figure 9:
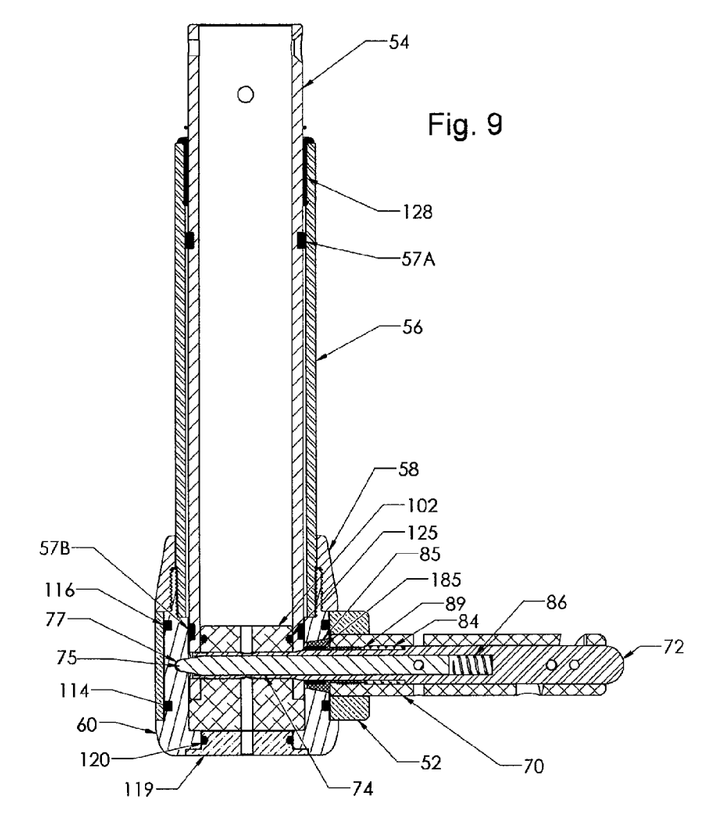
FIG. 9 is a sectional side view of the twist grip drive handle outrigger positioner in a locked condition.

FIG. 9 is a cross section side view of the twist grip drive handle outrigger positioner in a locked condition. In this position the drive handle spring (84) serves to bias the slide handle (70) and tapered insert (85), attached at the end thereof, into engagement with one of the two apertures located at the ends of positioning slot (118). The conical tip (75) of engagement pin (74) is biased, by spring (86), into engagement with one of the two conical recesses (77) formed on the inner cylindrical surface of slotted base collar (60).

Figure 10:
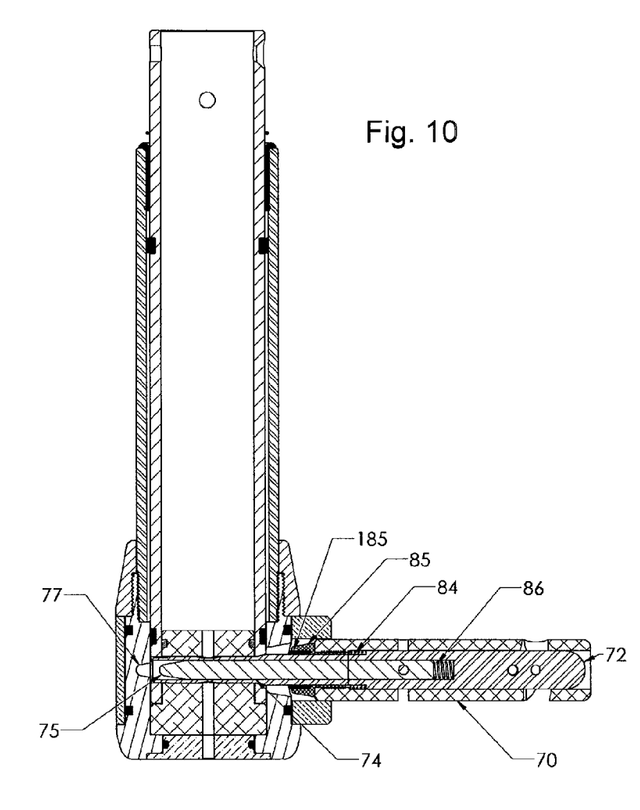
FIG. 10 is a sectional side view of the twist grip drive handle outrigger positioner in an unlocked condition.

FIG. 10 is a sectional side view of the twist grip drive handle outrigger positioner in an unlocked condition. In this position the slide handle (70) has been rotated by hand operation thereby causing the slide handle (70) to move radially outward in a linear fashion relative to the slotted base member (60). As can be seen in FIG. 10 the tapered insert (85) will disengage positioning slot (118) and the tip (75) of engagement pin (74) will disengage recess (77). Upon release of slide handle (70) the drive handle spring (84) will bias the slide handle (70) back towards the slotted base member (60).

Figure 11:
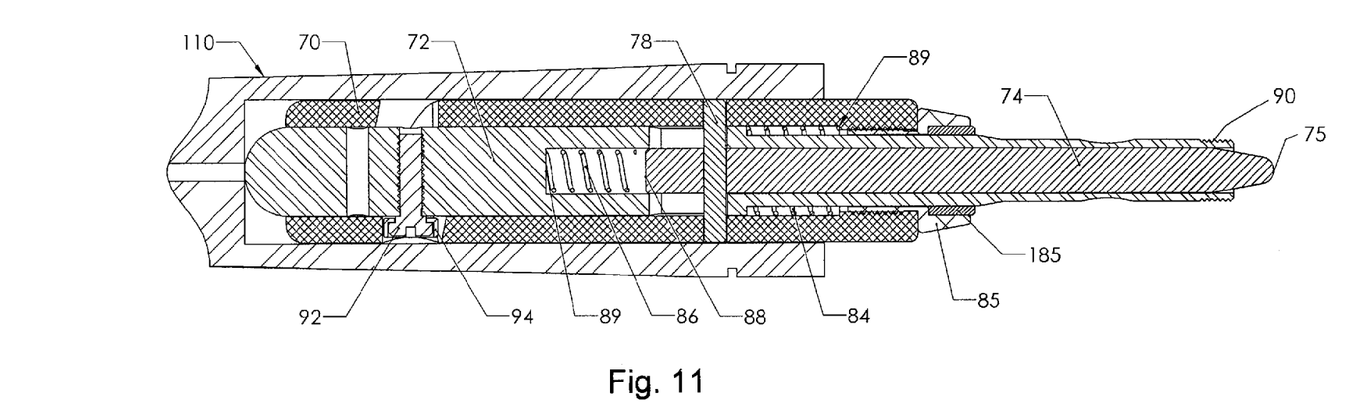
FIG. 11 is a cross sectional view of the drive handle assembly.
Figure 12:
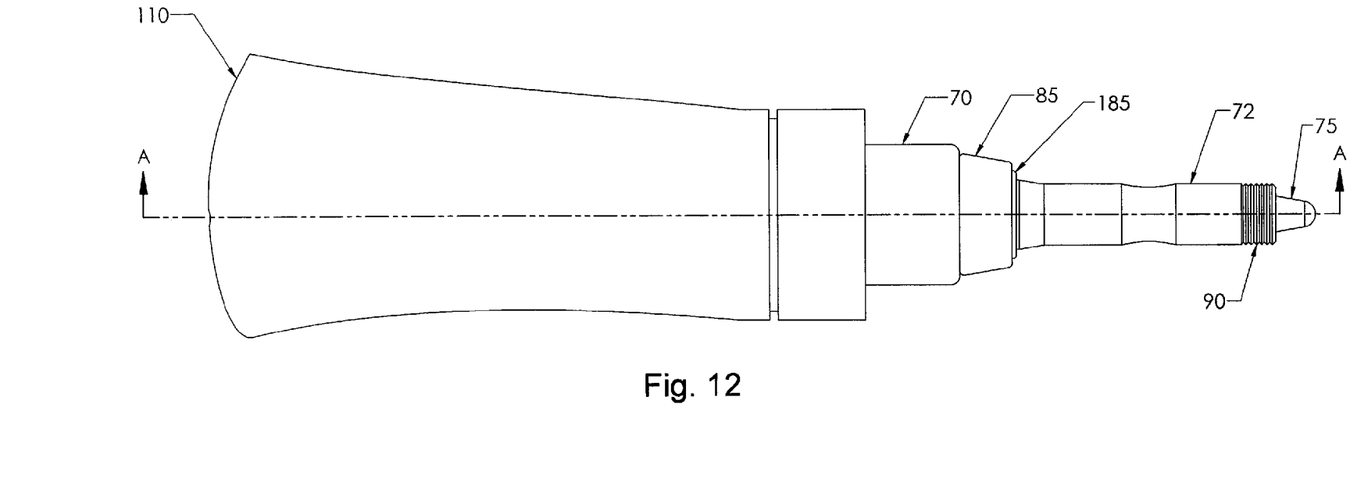
FIG. 12 is a perspective view of the drive handle assembly.

FIG. 11 is a cross sectional view of the drive handle assembly and FIG. 12 is a perspective view of the drive handle assembly. As shown in these figures a rubber grip (110) is resiliently fitted over slide handle (70) to provide an ergonomic and aesthetically pleasing appearance to the handle assembly. In addition, the rubber grip (110) will protect the component parts contained within the handle assembly. The slide handle (70) is slideable relative to the drive handle base (72). A tapered insert (85) with anti galling bushing (185) sleeved therein is secured to one end of slidable sleeve (70). A drive handle spring (84) is positioned between the slideable handle (70) and the drive handle base (72). The handle base (72) has external threads (90) located at one end that threadably engage internally treaded aperture (55B) located on rotation tube (54). An engagement pin (74) having a conical tip (75) is carried within the drive handle base (72). The engagement pin (74) is biased outwards by a helical spring (86) carried within the drive handle base (72). A locking pin (78) retains the engagement pin (74) with the handle base (72). A shoulder bolt (92) is threaded into drive handle base (72). A roller bearing (94) is carried by the head of shoulder bolt (92) and is positioned within one of the helical cuts (96,98).

One skilled in the art will readily appreciate that the present invention is well adapted to carry out the objectives and obtain the ends and advantages mentioned, as well as those inherent therein. The embodiments described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A twist grip drive handle positioner for an outrigger device used on a fishing vessel comprising:
   a base collar;
   a rotation tube vertically disposed and rotatably supported within said base collar;
   a handle assembly attached to said rotation tube, said handle assembly comprising a horizontally disposed rotatably slide handle having a helical cut groove engaged by a shoulder bolt secured to a spring biased engagement pin constructed and arranged to secure the rotation tube in a first positioning slot formed in said base collar;
   whereby rotation of said slide handle causes movement of said shoulder bolt along said helical cut groove creating linear movement of said engagement pin to permit disengagement from said rotation tube wherein said handle assembly allows movement of said rotation tube to permit said engagement pin to secure said rotation tube in a second positioning slot formed in said base collar.

2. The twist grip drive handle positioner for an outrigger device used on a fishing vessel of claim 1, further including a roller bearing attached to said shoulder bolt to provide frictionless movement of said shoulder bolt along said helical cut groove formed in said slide handle.

3. The twist grip drive handle positioner for an outrigger device used on a fishing vessel of claim 1 wherein said slide handle includes a tapered insert for ease of aligning said engagement pin in each of said first and second positioning slots.

4. The twist grip drive handle positioner for an outrigger device used on a fishing vessel of claim 3, further including a locking pin connecting said slide handle and said engagement pin.

5. The twist grip drive handle positioner for an outrigger device used on a fishing vessel of claim 3, wherein said tapered insert includes a bushing sleeved within said tapered insert to prevent galling when said tapered insert interfaces with said first and second positioning slots.

6. The twist grip drive handle positioner for an outrigger device used on a fishing vessel of claim 1, wherein said engagement pin includes a conical tip at one end thereof, said conical tip being sized and configured to mechanically cooperate with at least one conical recess formed on an inner cylindrical wall of said base collar, said spring biased engagement pin and said conical tip being biased into engagement with said at least one conical recess.

7. The twist grip drive handle positioner for an outrigger device used on a fishing vessel of claim 1 including an elongated rubber grip placed over a length of said slide handle constructed and arranged to facilitate slide handle rotation.

8. The twist grip drive handle positioner for an outrigger device used on a fishing vessel of claim 1 including a radial base tube having a hollow cylindrical cavity sized and configured to receive an outrigger pole, whereby movement of said handle assembly permits an outrigger pole secured to said radial base tube to be rotated from a stowage position to a trolling position and vice versa.

9. The twist grip drive handle positioner for an outrigger device used on a fishing vessel of claim 1, further including an outer cylindrical tube that is threaded into said base collar, said rotation tube located within said outer tube and further including a base plate having a split collar to clamp the outer cylindrical tube to said base plate, said split collar includes at least one fastener to draw the split collar into engagement with said outer cylindrical tube, said base plate being adapted to be fixedly mounted on a structural surface of a boat.

10. The twist grip drive handle positioner for an outrigger device used on a fishing vessel of claim 1, further including an engagement plug positioned within one end of said rotation tube, said engagement plug including a first and a second aperture connected by a cylindrical passageway extending through said engagement plug, said first aperture of said engagement plug in alignment with a first hole in said rotation tube and said second aperture of said engagement plug being in alignment with a second internally threaded aperture in said rotation tube.

11. The twist grip drive handle positioner for an outrigger device used on a fishing vessel of claim 10, wherein said slide handle includes a drive handle base member which includes a collar sleeve having a threaded end, said threaded end being threadably engaged with the second internally threaded aperture in said rotation tube.

12. The twist grip drive handle positioner for an outrigger device used on a fishing vessel of claim 1, wherein said rotation tube include at least one groove formed on the outer cylindrical surface thereof and a split bearing ring is located therein, whereby a bearing surface is provided between said rotation tube and an outer cylindrical tube.

13. The twist grip drive handle positioner for an outrigger device used on a fishing vessel of claim 1 wherein said helical cut groove permits clockwise rotation of said slide handle.

14. The twist grip drive handle positioner for an outrigger device used on a fishing vessel of claim 1 wherein said helical cut groove permits counter-clockwise rotation of said slide handle.

15. The twist grip drive handle positioner for an outrigger device used on a fishing vessel of claim 1 wherein said slide handle has a first helical cut groove to permit clockwise rotation of said slide handle and a second helical cut groove to permit counter-clockwise rotation of said slide handle, said shoulder bolt positionable in either said first or second helical cut groove for operator preference for rotation.

* * * * *